April 4, 1961     I. M. DAVIDSON     2,978,207
AIRCRAFT WITH JET FLAPS

Filed Dec. 10, 1958     5 Sheets-Sheet 1

Inventor
Ivor Macaulay Davidson
By
Stevens, Davis, Miller & Mosher
his Attorneys April 4, 1961 I. M. DAVIDSON 2,978,207
AIRCRAFT WITH JET FLAPS
Filed Dec. 10, 1958 5 Sheets-Sheet 2

April 4, 1961

I. M. DAVIDSON 2,978,207

AIRCRAFT WITH JET FLAPS

Filed Dec. 10, 1958

5 Sheets-Sheet 3

# United States Patent Office 2,978,207
Patented Apr. 4, 1961

2,978,207
AIRCRAFT WITH JET FLAPS

Ivor Macaulay Davidson, Farnborough, England, assignor to Power Jets (Research and Development) Limited, London, England, a British company Filed Dec. 10, 1958, Ser. No. 779,385

Claims priority, application Great Britain Sept. 18, 1958

11 Claims. (Cl. 244—42)

This invention relates to aircraft and its object is broadly to improve the manoeuvreability and general performance of an aircraft while simplifying the control arrangements. The present application is a continuation in part of application Serial No. 447,200 filed August 2, 1954, and now abandoned.

In conventional aircraft the lift on the wings in cruising flight is partly due to wing incidence and partly due to wing camber, the incidence lift component being applied in the region of the quarter chord point and the camber lift component being applied in the region of the point of maximum camber. In general these points are not coincident, so the resultant of these components is applied at a point—the centre of wing lift—somewhere between them, this point being in practice ahead of the mid-chord point of the wings. Normally aircraft have trailing edge wing flaps for use on landing and take-off and these when lowered give rise to a further flap lift force which is applied in the region of the mid-chord point. Under these circumstances the centre of wing lift tends to move aft and, assuming the aircraft loading is unchanged, a nose-down pitching moment on the aircraft is set up. This is partly counteracted by increased downwash on the tailplane (or upwash on the foreplane in a canard type aircraft). However, it is usually necessary in addition to trim the aircraft by adjusting the stabiliser (tailplane or foreplane) in such a way that wing incidence is increased when the flaps are lowered. In this way the component of lift due to incidence is increased together with the flap lift and the rearward movement of the centre of wing lift is limited.

However, the possible increase of incidence in this way is limited by the approach to the stall. Thus a limit must be set to the possible increase in flap lift, and this means that it may be difficult to take full advantage of high lift flaps and other trailing edge lift control devices, such as the arrangement described in copending application Serial No. 543,212, filed October 27, 1955, in the names of Davidson and Stratford and assigned to Power Jets (Research & Development) Limited. Moreover high incidence at landing and take-off (when the flaps are lowered) is inconvenient in that it often leads to restriction of the pilot's view and necessitates complications in undercarriage design.

The basis of the present invention is that substantially no reliance is placed on wing incidence for producing lift (except under supersonic flight conditions as will appear below). Lift is induced at the aircraft wings by trailing edge lift control devices and in some cases by wing camber. The aircraft centre of gravity will also be in the region of the mid-chord point and it is therefore a feature of the invention that the neutral point of the aircraft is to the rear of the mid-chord point, instead of forward of that point as hitherto. The aircraft is flown with the wings at substantially zero incidence and control in altitude and direction is effected by adjustment of the lift control devices on the wings which simulate the action of conventional wing flaps and ailerons and replace the conventional elevators.

The invention is more fully described by way of example with reference to the accompanying drawings of which:

Figure 1:
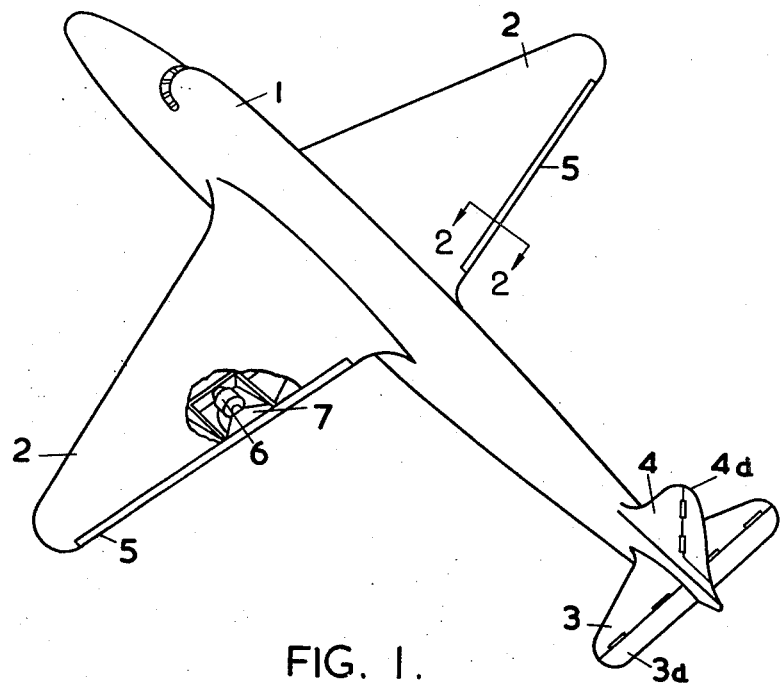
Figure 1 is a perspective view of an aircraft according to the invention.

In Figure 1 the aircraft comprises a fuselage 1, a pair of wings 2 attached to the fuselage on opposite sides of the aircraft fore-and-aft centre line, and a tailplane unit attached to the fuselage rearwardly of the wings and including a horizontal stabiliser or tailplane 3 provided with elevators 3a and a fin 4 and rudder 4a. Lift control devices in the form of trailing edge wing flaps 5 extend along substantially the full span of each wing as nearly as possible from root to tip as shown, or in any case preferably along a major part of the span. These flaps are of only short chordwise extent of about 2 to 5% and in any case not more than about 10 to 15% of the total wing chord.

The aircraft is jet-propelled by a plurality of jet engines located within and distributed spanwise along the wings, the arrangement being as disclosed in the above-mentioned application Serial No. 543,212. In Figure 1 part of the upper surface of one wing is shown as broken away to expose one engine 6 which is connected to discharge through a jet pipe 7 which progressively changes in shape rearwardly from circular section at its upstream end to terminate in a long shallow spanwise-extending jet nozzle 7a (see Figure 2). The engines are connected to draw in air through intakes (not shown) in the wing leading edges as disclosed in said copending application. The nozzles 7a together combine to form a long shallow discharge aperture extending along substantially the whole of the wing trailing edge, to the same extent as the flap 5, and are arranged to discharge the jet streams from the engines as a long thin spanwise-extending jet sheet 9 over the upper surface of the flap 5. The flap 5 is mounted for turning about a spanwise-extending pivotal axis 8, and the jet sheet 9 follows the flap upper surface and can be deflected by raising and lowering the flap.

Figure 3:
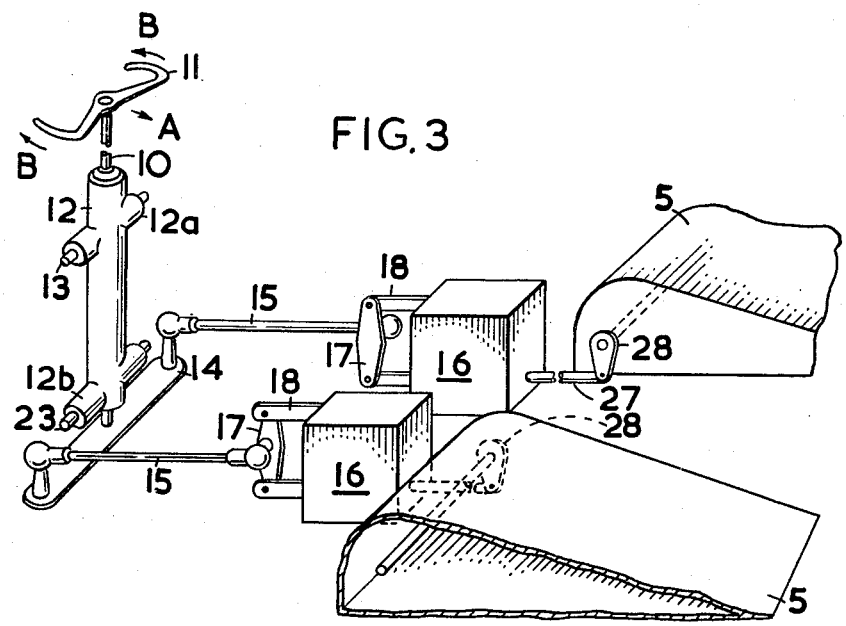
Figures 3 and 4 are pictorial views of the aircraft flying control mechanism.
Figure 4:
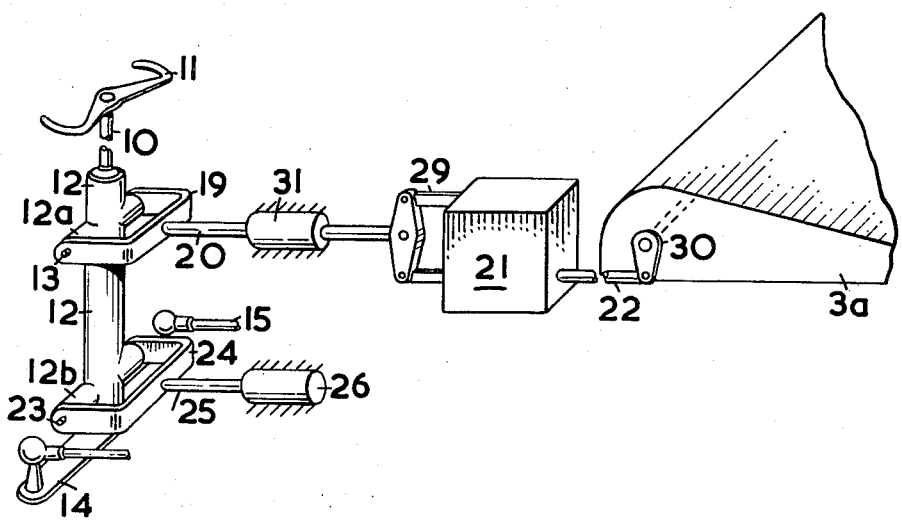

Figures 3 and 4 show the aircraft flying control mechanism, Figure 3 showing for the sake of clarity only part of the mechanism, the remaining parts being shown in Figure 4. The mechanism includes the usual pilot's control column 10 which is rotatable by means of a handwheel 11 in a casing 12 which has lateral projections 12a formed with trunnions 13 pivotally engaging with a bridle 19 (see Figure 4). To the lower end of the column 10 is secured a transverse lever 14 to which are pivotally jointed links 15. These links are connected to act through hydraulic servo-devices 16 of known type on rods 27 acting on cranks 28 connected one to each of the wing flaps 5 on opposite wings of the aircraft, the links 15 being pivotally linked to levers 17 which are linked in the usual manner to valve rods 18 and extensions of the links 27.

As shown in Figure 4, the bridle 19 is connected by link 20 and valve rods 29 to a further servo-device of known type and this servo-device is connected by an actuating link 22 and crank 30 to the elevators 3a. The link 20 includes a hydraulic lock 31. Further projections 12b on the casing 12 carry trunnions 23 pivotally engaging with a further bridle 24 which is connected by a link 25 to a further hydraulic lock 26, the pivotal axis of trunnions 23 being aligned with the pivotal connections between the lever 14 and links 15.

When the lock 31 is set in its locked position and the lock 26 is unlocked, the elevators 3a are set in a fixed position and the casing 12 is free to pivot about the pivotal axis of trunnions 13, which axis is then fixed. Bodily movement of the column 10 in a rearward direction as indicated by arrow A to turn the column about the last-mentioned axis will pull on both links 15 to actuate the servo-devices 16 to lower the two flaps 5 together in the same sense, while bodily movement of the column in the opposite sense will raise the flaps together. Turning the column 10 by turning the handwheel 11 as indicated by arrows B will turn lever 14 to actuate the servo-devices 16 and hence raise and lower the flaps differentially in opposite senses.

It will be noted that under the above conditions movement of the control column does not affect the position of the elevators 3a, but only the position of the flaps 5.

For certain operating conditions a change-over may be effected in which lock 31 is released and lock 26 set to lock the flaps 5 in some desired position. The casing 12 is then free to turn about the pivotal axis of trunnions 23, which axis is then fixed. Bodily movement of the column 10 in the direction of arrow A will actuate the servo-device 21 to raise the elevators, while movement of the column in the opposite direction serves to lower the elevators. Turning the column 10 in its casing is still effective to raise and lower the flaps 5 differentially in opposite senses.

Figure 5:
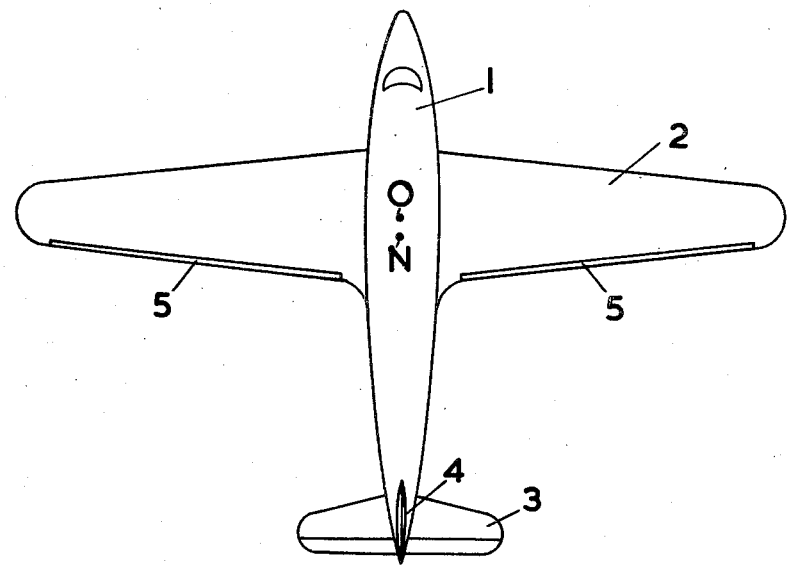
Figure 5 is a diagrammatic plan view of the aircraft.

Referring now to Figure 5, O denotes the mid-chord point of the wings 2, that is, the centre of area of the wings, or the mid-point of the standard mean chord. In the embodiment illustrated the wing is shown as symmetrical about a line joining the wing tips, so that the mid-chord O lies on this line. N denotes the neutral point of the aircraft, that is, the aerodynamic centre of the whole aircraft (including the tailplane unit), or the point through which acts the resultant of an increment of lift on the whole aircraft due to an infinitesimal change of incidence. The location of the neutral point is determined by the tailplane volume, that is, the product of the tailplane area and its distance from the aircraft centre of gravity, and it is a feature of the present invention that the area of the tailplane 3 and its location relative to the wings 2 are such that the neutral point N is to the rear of the mid-chord point O instead of forward of that point as hitherto proposed. The neutral point N may be located at only a short distance to the rear of mid-chord point O, say, at 55 percent of the standard mean chord. For this condition, the tailplane volume will be about twice the tailplane volume of a normally designed aircraft not employing the present invention.

Figure 6:
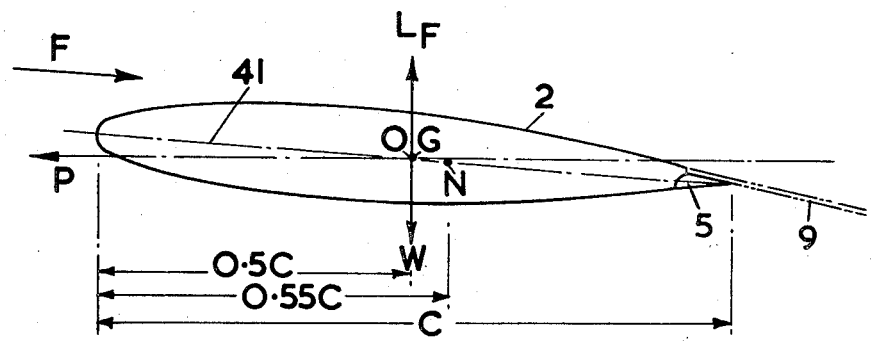
Figure 6 is a diagrammatic view of a typical chordwise section through the aircraft wing, showing the principle of operation of the invention.

Reference is now made to Figure 6 in which the broken line 41 represents the wing chord line. The wing chord is denoted by C while the mid-chord point O and the neutral point N are shown as being respectively located at 0.5C and 0.55C from the wing leading edge. The arrangement and configuration of the aircraft are such that the aircraft centre of gravity G is approximately at the mid-chord point O of the wings. For the sake of example the centre of gravity and the mid-chord point are shown as coincident but they might be vertically displaced from one another. It will also be understood that the position of the centre of gravity will vary to some extent with the aircraft loading, but it will never be to the rear of the neutral point N, this being the rearmost position which the centre of gravity can take up without the aircraft becoming longitudinally unstable. Thus the neutral point must be far enough aft of the mid-chord point to afford an adequate margin of stability.

Figure 2:
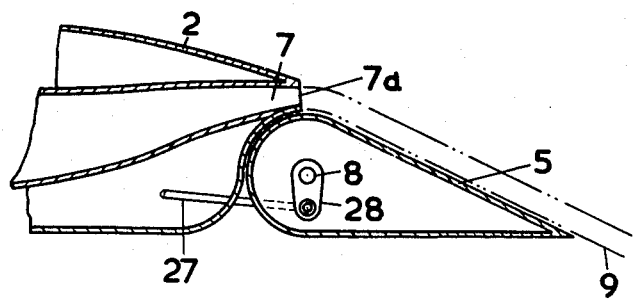
Figure 2 is an enlarged chordwise section of the rear part of the aircraft wing taken on the line II—II in Figure 1.

Flight of the aircraft is carried out at substantially zero incidence of the wings, that is, with the wing chord line 41 substantially aligned with the general direction of flow past the wing as indicated by the arrow F in Figure 6. This flow will be in a direction somewhat downwardly inclined from the flight path so that the wing will be at a small positive incidence relative to the flight path indicated by the arrow P. The direction of the incident flow will normally vary along the wing span and the wing will be twisted accordingly to align the chord line with the flow at each station along the wing span. The jet sheet 9, while it is being discharged in a somewhat downwardly inclined direction with respect to the flight path as shown in Figures 2 and 6, has by its interaction with the main stream flow over the wing, an effect analogous to that of a conventional wing flap and induces a "flap" lift force $L_F$ which is applied approximately at the mid-chord point. Normally an aircraft wing operates at incidence and so there is an additional lift force due to incidence which is applied in the region of 0.25C from the wing leading edge, but since according to the present invention the aircraft is operated with the wing at zero incidence, there is substantially no incidence lift force and so the whole lifting force is applied at the mid-chord point. Since the centre of gravity is also at the mid-chord point no pitching moment on the aircraft is set up.

Normal cruising flight of the aircraft is carried out with the flaps 5 in the datum position shown in Figure 2 with the jet sheets 9 discharged in rearward and somewhat downwardly inclined direction. Under these conditions the momentum and direction of discharge of the jet sheets are such that the lift $L_F$ induced thereby on the wings is substantially equal to the weight W of the aircraft.

For control of the aircraft under cruising conditions, the lock 31 is set in its locked position while the lock 26 is unlocked. The equivalent of elevator control for controlling the aircraft in altitude, i.e., for causing the aircraft to climb and descend, is obtained by moving the control column 10 bodily about the pivotal axis of trunnions 13. The flaps on opposite wing are thereby raised or lowered from the datum position and the two jet sheets deflected upwardly or downwardly together in the same sense, so that the magnitude of the lifting force on the wing is decreased or increased. The zero incidence altitude is, however, maintained so that the lifting force is still applied at the mid-chord point and no change in longitudinal trim occurs.

For lateral or directional control of the aircraft, the control column 10 is turned in its casing, and as explained above, this will give the equivalent of aileron control by turning the flaps differentially, that is, by raising the flap on one wing and lowering the flap on the other, and so effecting differential deflection of the jet sheets 9. Operation of the flaps as the equivalent of ailerons in this manner will be effected in conjunction with the usual control by the rudder 4a.

During take-off and landing when a considerable increase in lift is required, the flaps of the two wings can be lowered very considerably and the jet sheets deflected downwardly together, when they will induce on the wings an increase in lift in the manner of normal landing flaps, although their behaviour is quite different since the increase in lift will be unaccompanied by an appreciable increase in profile drag. Again the aircraft remains at zero incidence so that the lifting force is still applied at the mid-chord point.

Thus substantially all control over the motion of the aircraft is effected by deflecting the jet sheets 9 by means of flaps 5, by throttle control of the engines, and by use of the rudder 4a, this latter being the only other control surface necessarily provided, and the tailplane 3 serving only as a stabilizer. The control equipment of the aircraft can accordingly be simplified.

As mentioned above the position of the aircraft centre of gravity varies with change of loading, while the position at which the lifting force is applied varies with the degree of deflection and the mass flow and velocity of the jet streams. These variations are, however, relatively small, of the order of 1 or 2% of the wing chord in any one flight phase, though there might possibly be a slightly greater variation on, for example, lowering the flaps to change from cruising flight to landing conditions, and such variations can be allowed for by trimming the aircraft in known manner. Thus the tailplane 3 may be pivotally mounted or there may be trim tabs on the elevators, adjustments being effected by a conventional trimming control.

Under supersonic flight conditions it is not possible to effect control of the aircraft by deflection of the jet sheets without change of incidence as described above. Accordingly for flying steadily at supersonic speeds the changeover in the control system previously referred to is effected whereby bodily movement of the control column 10 will serve to raise and lower the elevators 3a in the normal manner, thus varying the wing incidence.

The changeover might also be effected so that the elevators can be used in an emergency such as failure of the jet engines 6. In an aircraft not intended for supersonic flight the changeover mechanism might not be required. In this case the elevators and the part of the control mechanism associated therewith would be dispensed with.

Figure 7:
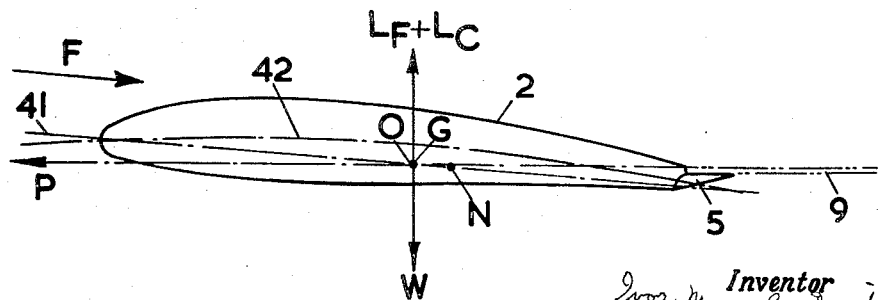
Figures 7 and 8 are views corresponding to Figures 6 and 2 respectively of a modified form of the invention.
Figure 8:
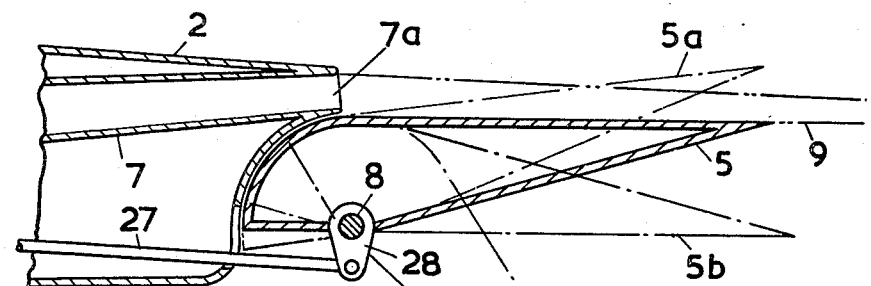
Figure 9:
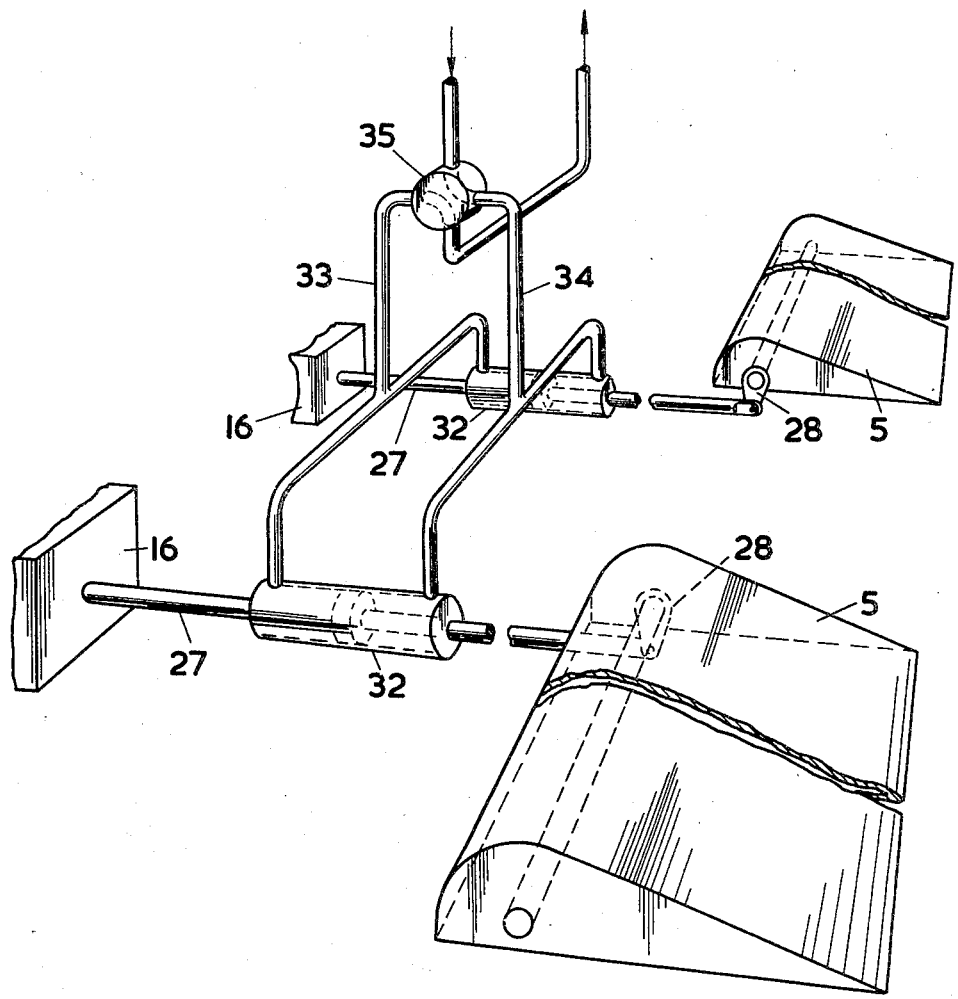
Figure 9 is a pictorial view of a modification of the flying control mechanism shown in Figures 3 and 4.

Another embodiment of the invention is shown in Figures 7 to 9 in which the same reference numerals have been used for corresponding components. In this embodiment the wing is cambered in such a manner that the component of wing lift $L_C$ due to camber is applied substantially at the mid-chord point O of the wings. Thus each fore-and-aft transverse section of the wings is symmetrically cambered with its maximum camber at the mid-point of that section. As shown in Figure 7 the camber line 42 takes the form of a circular arc, though other shapes, for example a parabolic arc with the vertex at the mid-point of the wing section, could be used.

As in the previously described embodiment the aircraft is powered by jet engines connected to discharge propulsive jet streams through long shallow jet nozzles 7a (see Figure 8) as a jet sheet 9 which follows the upper surface of a trailing edge wing flap 5, and can be deflected upwardly and downwardly thereby. The flaps are operable by a mechanism which is the same as that shown in Figures 3 and 4 except that as shown in Figure 9 the rods 27 are of variable length, each including a hydraulic jack 32 to which hydraulic fluid can be supplied through pipes 33, 34 and a common reversing valve 35. The mechanism is thus similar to that described in copending application Serial No. 609,450 filed September 16, 1956, in the name of the present applicant.

As shown in Figure 8 the jet nozzles 7a are slightly upwardly inclined to the rearward direction. The flap 5 is shown in full lines in its datum position which is such that the curved part of its upper surface forms in effect a rearward continuation of the lower edge of the jet nozzle. The jet sheet is induced to follow the upper surface of the flap and is discharged directly rearwardly with respect to the flight path as indicated by arrow P in Figure 7. Under these conditions a camber lift force $L_C$ is generated at the mid-chord point and the camber is such that in normal cruising flight with the wings at zero incidence the camber lift is sufficient by itself to support the weight of the aircraft.

By operation of the control column 10 in the manner described with reference to Figures 3 and 4, the flaps 5 can be raised or lowered through relatively small angles to the positions indicated in broken lines in Figure 8 at 5a and 5b, so that the jet sheets can be deflected upwardly and downwardly either together to give the effect of elevators or differentially to give the effect of ailerons. When increased lift is required at reduced flying speeds, for example, on take-off and landing, hydraulic fluid is admitted to the jacks 32 to retract them and hence lower the two flaps 5 together to the position shown in broken lines at 5c in Figure 8, so that the jet sheets are deflected downwardly through a considerable angle and the lift correspondingly increased. The lifting force $L_F$ caused by downward deflection of the jet sheets (or the negative lift caused by upward deflection) is applied in the same region as the camber lift, i.e., at the mid-chord point, and hence in the region of the centre of gravity. Thus the aircraft can be controlled by relatively small deflections of the jet sheets effected by the pilot's control column 10, independently of the hydraulic jacks 32 and about any position within the comparatively large range of deflection effected thereby, while the zero incidence attitude of the aircraft is maintained.

As in the previously described embodiment the aircraft may need to be trimmed by relatively small adjustments of the tailplane or elevator trim tabs. Since as mentioned above the greatest change in trim is liable to occur when the jet sheets are deflected downwardly through a large angle, the trimming control might be linked to the valve 35 for admitting hydraulic fluid to the jacks 32.

Figure 10:
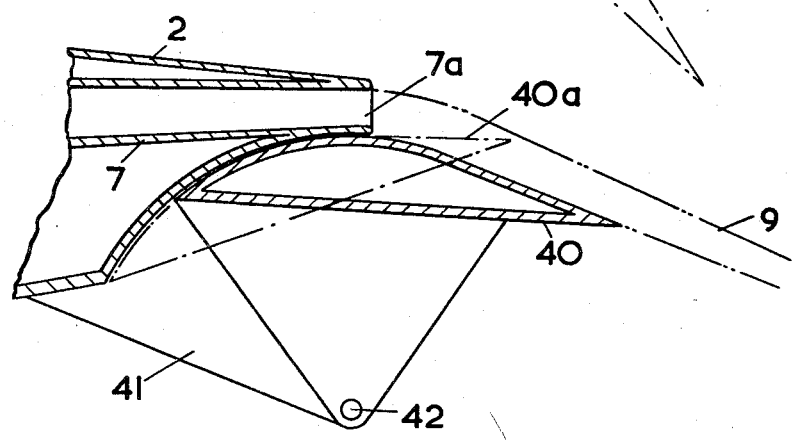
Figure 10 is a sectional view corresponding to Figures 2 and 8 of yet another form of the invention.

In an aircraft having retractable or extension flaps some difficulty may be encountered in providing for upward deflection of the jet sheet. An arrangement with such a flap is shown in Figure 10, the flap 40 being pivotally mounted on brackets 41 for turning about a spanwise-extending axis 42 below the wing. The jet nozzles 7a are in this case directly rearwardly facing in relation to the aircraft flight path, and the datum position of the flap is as shown in full lines in which the flap is partly extended and the curved part of its upper surface forms a rearward and downward continuation of the lower edge of the nozzles 7a and causes the jet sheet 9 to be discharged in a rearward and somewhat downwardly inclined direction. With the flap in this position a lifting force $L_F$ is induced at the mid-chord point in addition to the camber lift $L_C$ in the manner indicated in Figure 7, and the wing camber and the momentum and direction of discharge of the jet sheets are such that the two lift forces $L_F$ and $L_C$ are together sufficient to support the weight W of the aircraft in cruising flight. By turning the flaps 40 upwardly or downwardly the magnitude of the lift force $L_F$ is varied, but while the zero incidence attitude is maintained, the point of application of the lift forces remains substantially unchanged. The maximum upwards movement of the flap takes it to the position shown in dotted lines at 40a in which it is in its fully retracted position with the flat rearward part of the flap upper surface forming a directly rearward continuation of the lower edge of the nozzle 7a, so that the jet sheet is discharged directly rearwardly relative to the flight path. It will be understood that with the flap in this position the lift on the aircraft wings is that due to wing camber alone.

In the above described embodiments lift on the aircraft wings is induced by the interaction of rearwardly discharged jet sheets with the main stream flow over the wings, and the flaps serve primarily as jet deflectors. The invention is, however, also applicable to aircraft with trailing edge lift control devices in the form of conventional wing flaps.

Figure 11:
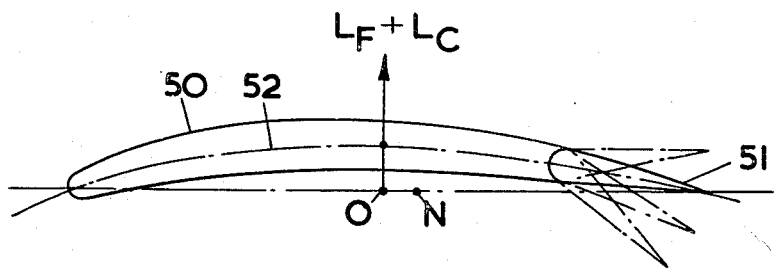
Figure 11 is a view corresponding to Figures 6 and 7 of still another form of the invention.

Thus as shown in Figure 11 each wing 50 of the aircraft has a conventional plain trailing edge wing flap 51 which will normally be somewhat larger than the flaps of the previously described embodiments. With the object of keeping the flaps as small as possible, they are preferably arranged in conjunction with an opening similarly located to the jet nozzles 7a of the previously described embodiments for blowing air out or sucking air in over the upper surface of the flaps for boundary layer control. The wing is cambered in the manner previously described with the maximum camber at the mid-chord point O while the neutral point N of the aircraft is aft of the mid-chord point.

The flap 51 is shown in full lines in its datum or neutral position. In normal cruising flight the wing is at zero incidence in the sense defined above, and the wing camber is such that the camber lift $L_C$ generated at the mid-chord point is sufficient to sustain the aircraft. The flaps are operable by a mechanism of the type shown in Figure 8, and each can be raised or lowered to the positions indicated in dotted lines in same way as the flaps of the previously described embodiments, the lifting force $L_F$ due to the flaps also being induced at the mid-chord point.

The plain flaps of Figure 11 may be replaced by retractable, e.g., extension or split flaps. In such a case, the datum position of the flaps will be one in which they are slightly lowered or extended from their fully retracted position, the aircraft being sustained in cruising flight by camber lift together with a certain amount of flap lift.

In any of the embodiments described the whole tailplane 3 may be bodily pivotable about a horizontal axis so as to constitute a control surface, in which case the elevators 3a may be dispensed with, and the control mechanism of Figure 4 connected to turn the tailplane.

Other forms of engine installation could be used, for example, those disclosed in United States Patent No. 2,838,256 in the names of Davidson and Dimmock or in copending application Serial No. 710,575 filed January 22, 1958, in the name of present applicant.

In all the above-described embodiments it is assumed for the sake of simplicity that the mid-chord point O lies on a line joining the wing tips, but this is of course not always the case. Thus the sectional views of wing, Figures 6, 7 and 11 should in the general case be regarded as representing an "average" section of the wing or a section corresponding to the standard mean chord. It would also be possible in the embodiments of Figures 7 and 11 for the position of maximum camber of individual chordwise sections through the wing to vary along the wing span, provided the resultant of the camber lift components acts at the centre of area of the wings.

While as mentioned above the aircraft wings may be twisted so that each part thereof is at zero incidence, it is possible for one part of a wing to be at a positive incidence and another part at a negative incidence, but in any case it is intended that there shall be substantially no component of lift on the aircraft due to wing incidence. Thus the angle of incidence of the standard mean chord may be regarded as zero.

I claim:

1. An aircraft comprising a fuselage; a pair of opposite wings attached to the fuselage, one on each side thereof; a lift control device on each of said wings extending along their trailing edges; a control member in actuating connection with the lift control devices to vary the setting thereof and hence vary the lift on the wings; and a tailplane attached to the fuselage at such a distance rearwardly of the wings and so proportioned relatively to the aircraft that the neutral point of the aircraft is located to the rear of the mid-chord point of the wings.

2. An aircraft comprising a fuselage; a pair of opposite wings attached to the fuselage, one on each side thereof; jet propulsion means arranged to discharge propulsive jet streams as long thin jet sheets issuing in a rearward direction from the wing trailing edges and extending spanwise of the wings; jet deflectors extending along the wing trailing edges and operable to deflect the jet sheets upwardly and downwardly to vary the lift on the wings induced by the jet sheets; a control member in actuating connection with the jet deflectors; and a tailplane attached to the fuselage at such a distance rearwardly of the wings and so proportioned relatively to the aircraft that the neutral point of the aircraft is located to the rear of the mid-chord point of the wings.

3. An aircraft according to claim 2 wherein said control member comprises a means operable to actuate the jet deflectors to deflect the jet sheets from opposite wings upwardly together, downwardly together, or differentially at will.

4. An aircraft comprising a fuselage; a pair of opposite wings attached to the fuselage, one on each side thereof; a wing flap extending along the trailing edge of each wing; means mounting each said flap for turning about a spanwise-extending axis; jet propulsion means arranged to discharge propulsive jet streams rearwardly over the upper surfaces of the flaps so that they leave the flap trailing edges in a rearward direction as long thin jet sheets extending along the span of the flaps; a control member operable to turn the flaps to deflect the jet sheets upwardly and downwardly to vary the lift on the wings induced by the jet sheets; and a tailplane attached to the fuselage at such a distance rearwardly of the wings and so proportioned relatively to the aircraft that the neutral point of the aircraft is located to the rear of the mid-chord point of the wings.

5. An aircraft comprising a fuselage; a pair of opposite wings attached to the fuselage, one on each side thereof; a wing flap extending along the trailing edge of each wing; means mounting each said flap for turning about a spanwise-extending axis; a control member operable to turn the flaps upwardly and downwardly to vary the lift on the wings induced by the flaps; and a tailplane attached to the fuselage at such a distance rearwardly of the wings and so proportioned relatively to the aircraft that the neutral point of the aircraft is located to the rear of the mid-chord point of the wings.

6. An aircraft according to claim 5 wherein the control member is operable to turn the flaps on opposite wings upwardly together, downwardly together or differentially, at will.

7. An aircraft comprising a fuselage; a pair of opposite cambered wings attached to the fuselage, one on each side thereof, the maximum camber of the wings being at the mid-chord point; a lift control device on each of said wings extending along their trailing edges; a control member in actuating connection with the lift control devices to vary the setting thereof and hence vary the lift on the wings; and a tailplane attached to the fuselage at such a distance rearwardly of the wings and so proportioned relatively to the aircraft that the neutral point of the aircraft is located to the rear of the mid-chord point of the wings.

8. An aircraft comprising a fuselage; a pair of opposite wings attached to the fuselage, one on each side thereof; a wing flap extending along the trailing edge of each wing; means mounting each said flap for turning about a spanwise-extending axis; jet propulsion means arranged to discharge propulsive jet streams rearwardly over the upper surfaces of the flaps as long thin jet sheets extending along the span of the flaps, the jet propulsion means being such that the jet sheets are discharged from the flap trailing edges in the direction in which said trailing edges are pointing and afford sufficient propulsive effort to propel the aircraft; a control member operable to turn the flaps to deflect the jet sheets upwardly and downwardly to vary the lift on the wings induced by the jet sheets; and a tailplane attached to the fuselage at such a distance rearwardly of the wings and so proportioned relatively to the aircraft that the neutral point of the aircraft is located to the rear of the mid-chord point of the wings.

9. An aircraft comprising a fuselage; a pair of opposite wings attached to the fuselage, one on each side thereof; a lift control device on each of said wings extending along their trailing edges; a stabiliser attached to the fuselage and spaced from the wings, at least part of said stabiliser constituting a control surface; a control member in actuating connection with said lift control devices and said control surface, said member being operable to actuate the lift control devices on opposite wings differentially and also operable selectively either to actuate the lift control devices on opposite wings together or to actuate said control surface; means operable to lock said lift control device on opposite wings against movement together in the same sense; and means operable to lock said control surface against movement.

10. An aircraft comprising a fuselage; a pair of opposite wings attached to the fuselage, one on each side thereof; a lift control device on each of said wings extending along their trailing edges; a pilot's control column in actuating connection with said lift control devices, said column being operable in one manner to vary the setting of the lift control devices on opposite wings together in the same sense, and operable in another manner to vary the setting of the lift control means on opposite wings differentially; and a tailplane attached to the fuselage at such a distance rearwardly of the wings and so proportioned relatively to the aircraft that the neutral point of the aircraft is located to the rear of the mid-chord point of the wings.

11. An aircraft according to claim 10 wherein the column is mounted for pivotal movement about a transverse axis of the aircraft to vary the setting of the lift control devices on opposite wings in the same sense, and has mounted thereon a handwheel connected to vary the setting of the lift control devices on opposite wings differentially.

References Cited in the file of this patent

UNITED STATES PATENTS

| | | |
|---|---|---|
| 1,406,617 | Dalton | Feb. 14, 1922 |
| 1,891,812 | Guthier | Dec. 20, 1932 |
| 2,585,676 | Poisson-Quinton | Feb. 12, 1952 |